United States Patent
Suzuki et al.

(10) Patent No.: US 11,007,873 B2
(45) Date of Patent: May 18, 2021

(54) ENGINE CONTROL METHOD AND ENGINE CONTROL DEVICE FOR STRADDLE-TYPE VEHICLE

(71) Applicant: SUZUKI MOTOR CORPORATION, Hamamatsu (JP)

(72) Inventors: Takashi Suzuki, Hamamatsu (JP); Hiromi Deguchi, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 167 days.

(21) Appl. No.: 16/213,231

(22) Filed: Dec. 7, 2018

(65) Prior Publication Data

US 2019/0176622 A1 Jun. 13, 2019

(30) Foreign Application Priority Data

Dec. 11, 2017 (JP) .............................. JP2017-237168

(51) Int. Cl.
| | |
|---|---|
| *B60K 28/14* | (2006.01) |
| *B62J 99/00* | (2020.01) |
| *B60K 28/10* | (2006.01) |
| *B62M 7/02* | (2006.01) |
| *B62J 45/20* | (2020.01) |
| *B62J 45/40* | (2020.01) |
| *B62J 45/415* | (2020.01) |

(52) U.S. Cl.
CPC .............. *B60K 28/14* (2013.01); *B60K 28/10* (2013.01); *B62J 99/00* (2013.01); *B60W 2300/36* (2013.01); *B60W 2520/263* (2013.01); *B62J 45/20* (2020.02); *B62J 45/40* (2020.02); *B62J 45/4151* (2020.02); *B62M 7/02* (2013.01)

(58) Field of Classification Search
CPC .......... B60K 28/14; B60K 28/10; B62J 99/00; B62J 45/20; B62J 45/40; B62J 45/4151; B60W 2300/36; B60W 2520/263; B62M 7/02
USPC ......................................................... 701/102
See application file for complete search history.

(56) References Cited

U.S. PATENT DOCUMENTS

| | | | |
|---|---|---|---|
| 2002/0039951 A1* | 4/2002 | Hasegawa ................ | B62J 27/00 477/183 |
| 2004/0050609 A1* | 3/2004 | Machida ............... | F02N 11/101 180/282 |

(Continued)

FOREIGN PATENT DOCUMENTS

JP 2002-71703 A 3/2002

*Primary Examiner* — Joseph J Dallo
*Assistant Examiner* — Scott A Reinbold
(74) *Attorney, Agent, or Firm* — Stein IP, LLC

(57) ABSTRACT

An engine control method for the straddle-type vehicle including a non-driving wheel state determination step of determining whether a front wheel of the straddle-type vehicle is in a substantially stopped state, a driving wheel state determination step of determining whether a rear wheel of the straddle-type vehicle is in a substantially rotating state, and an engine stop control step of performing an engine stop control of the straddle-type vehicle. In the engine stop control step, the engine stop control of the straddle-type vehicle is performed when it is determined that the front wheel is in the substantially stopped state in the non-driving wheel state determination step, and the rear wheel is in the substantially rotating state in the driving wheel state determination step.

7 Claims, 5 Drawing Sheets

(56) References Cited

U.S. PATENT DOCUMENTS

| | | | | |
|---|---|---|---|---|
| 2011/0297462 A1* | 12/2011 | Grajkowski | .......... | B60W 10/06 |
| | | | | 180/54.1 |
| 2013/0041522 A1* | 2/2013 | Mori | .................... | G07C 5/0808 |
| | | | | 701/1 |
| 2017/0057354 A1* | 3/2017 | Nishihara | .............. | B60W 50/16 |
| 2020/0031300 A1* | 1/2020 | Shibuya | ..................... | B62J 3/14 |

* cited by examiner

ENGINE CONTROL METHOD AND ENGINE CONTROL DEVICE FOR STRADDLE-TYPE VEHICLE

CROSS-REFERENCE TO RELATED APPLICATIONS

This application is based on and claims priority under 35 USC 119 from Japanese Patent Application No. 2017-237168 filed on Dec. 11, 2017, the contents of which are incorporated herein by reference.

BACKGROUND

The present invention relates to an engine control method and an engine control device for a straddle-type vehicle such as a motorcycle.

There is known a motorcycle in which an inclination of a vehicle body is detected by an acceleration sensor, and an engine stop control is performed when it is determined that the vehicle body is overturned based on the inclination (for example, see the following Patent Document 1).

Patent Document 1: JP-A-2002-71703

SUMMARY

According to an aspect of the present invention, there is provided an engine control method for the straddle-type vehicle, which includes: a non-driving wheel state determination step of determining whether a non-driving wheel of the straddle-type vehicle is in a substantially stopped state; a driving wheel state determination step of determining whether a driving wheel of the straddle-type vehicle is in a substantially rotating state; and an engine stop control step of performing an engine stop control of the straddle-type vehicle, wherein, in the engine stop control step, the engine stop control of the straddle-type vehicle is performed when it is determined that the non-driving wheel is in the substantially stopped state in the non-driving wheel state determination step and the driving wheel is in the substantially rotating state in the driving wheel state determination step.

According to another aspect of the present invention, there is provided an engine control device for the straddle-type vehicle, which includes: a non-driving wheel state determination part which determines whether a non-driving wheel of the straddle-type vehicle is in a substantially stopped state; a driving wheel state determination part which determines whether a driving wheel of the straddle-type vehicle is in a substantially rotating state; and an engine stop control part which performs an engine stop control of the straddle-type vehicle, wherein the engine stop control part performs the engine stop control of the straddle-type vehicle when the non-driving wheel state determination part determines that the non-driving wheel is in the substantially stopped state, and the driving wheel state determination part determines that the driving wheel is in the substantially rotating state.

DETAILED DESCRIPTION OF EXEMPLIFIED EMBODIMENTS

Figure 1:
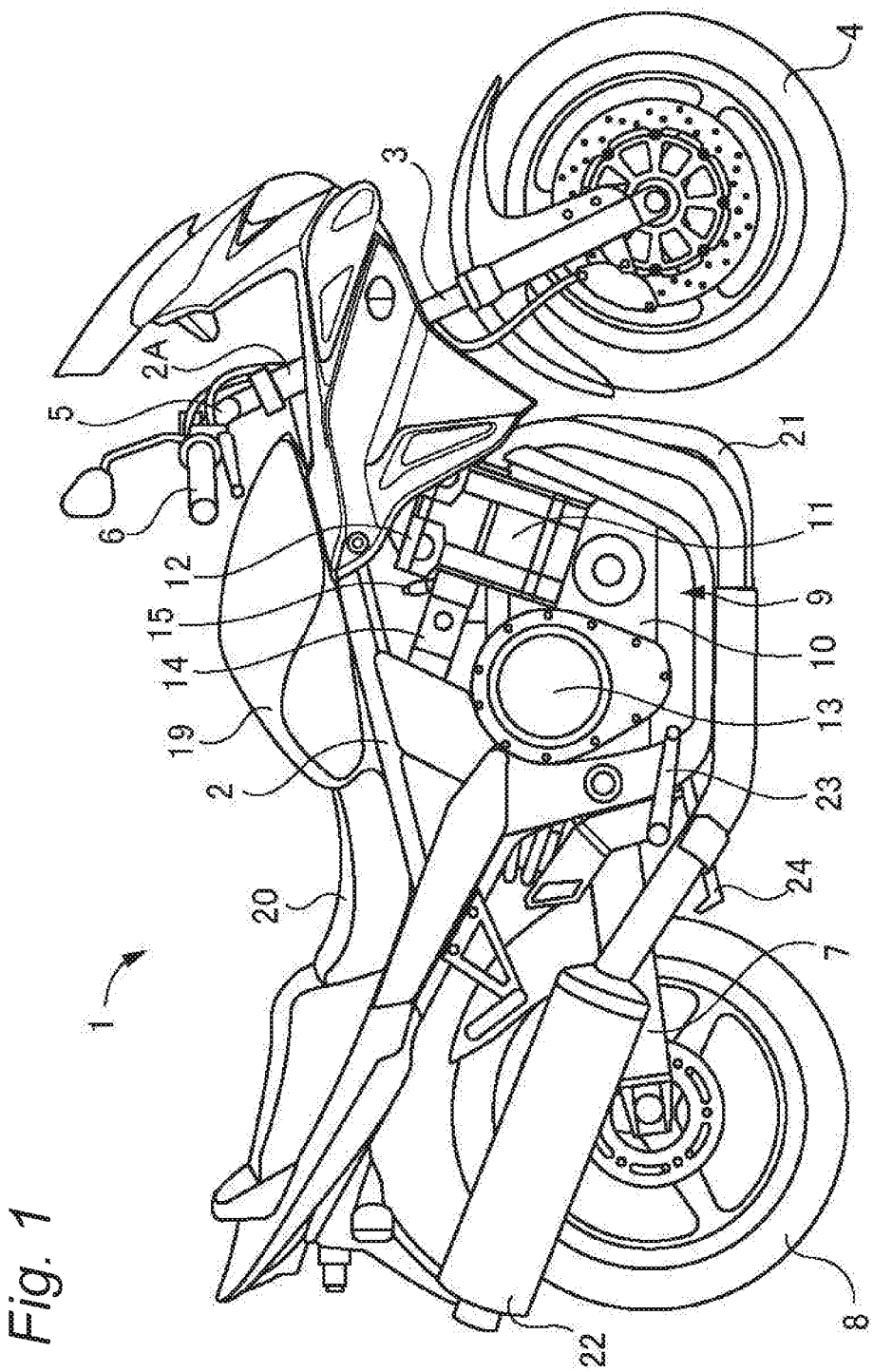
FIG. 1 is an external view illustrating a straddle-type vehicle.

The acceleration sensor is expensive. Therefore, in a low price straddle-type vehicle, it is desirable to perform the engine stop control at the time of overturning the vehicle body by using a detection means which is less expensive than the acceleration sensor.

In addition, in the straddle-type vehicle in which the engine stop control is performed by determining an overturn of the vehicle body based on the inclination of the vehicle body detected by the acceleration sensor, for example, in preparation for the case where the acceleration sensor fails, it may be required to provide a spare detection means which can determine the overturn of the vehicle body. In this case, it is conceivable that two acceleration sensors are provided in the straddle-type vehicle, the inclination of the vehicle body is detected by one of the acceleration sensors at a normal time, and the inclination of the vehicle body is detected by the other acceleration sensor when the one acceleration sensor fails. However, in order to suppress an increase in the price of the straddle-type vehicle, a detection means which is less expensive than the acceleration sensor is desired as the spare detection means.

The present invention has been made in view of the above problems, for example, and an object of the present invention is to provide an engine control method and an engine control device according to which engine stop control at the time of overturning a vehicle body can be realized inexpensively.

An engine control method according to an embodiment of the present invention includes a non-driving wheel state determination step, a driving wheel state determination step, and an engine stop control step.

In the non-driving wheel state determination step, it is determined whether a non-driving wheel of a straddle-type vehicle is in a substantially stopped state. The non-driving wheel is a wheel to which power of an engine is not transmitted by a power transmission mechanism, and refers to the front wheel in most straddle-type vehicles. The substantially stopped state is a state in which a wheel is completely stopped or a state in which the wheel is not completely stopped but rotation speed thereof is very slow and can be regarded as being stopped.

In the driving wheel state determination step, it is determined whether a driving wheel of the straddle-type vehicle is in a substantially rotating state. The driving wheel is a wheel to which power of an engine is transmitted by a power transmission mechanism, and refers to the rear wheel in most straddle-type vehicles. The substantially rotating state is a state in which a wheel is not in the above substantially stopped state, that is, the wheel is not stopped and cannot be regarded as being stopped.

In the engine stop control step, engine stop control of the straddle-type vehicle is performed when it is determined that the non-driving wheel is in the substantially stopped state in the non-driving wheel state determination step and the driving wheel is in the substantially rotating state in the driving wheel state determination step. That is, when the straddle-type vehicle is overturned, the non-driving wheel is no longer in a state of rotating on the ground but stops, and the driving wheel keeps rotating by receiving power transmitted from the engine until the engine stops. Therefore, when the non-driving wheel is in the substantially stopped state and the driving wheel is in the substantially rotating state, it can be determined that the straddle-type vehicle is overturned. In this case, control for stopping the engine is performed.

According to the engine control method of the embodiment of the present invention, it is possible to realize the engine stop control at the time of overturning the vehicle body inexpensively. That is, the determination of whether or not the non-driving wheel is in the substantially stopped state can be performed by detecting the rotation of the non-driving wheel with, for example, a vehicle speed sensor. The determination of whether or not the driving wheel is in the substantially rotating state can be performed by detecting the rotation of the driving wheel with, for example, a vehicle speed sensor. Generally, a vehicle speed sensor is less expensive than an acceleration sensor. When a total price of two vehicle speed sensors is lower than a price of one acceleration sensor, even if the vehicle speed sensor for detecting the rotation of the non-driving wheel and the vehicle speed sensor for detecting the rotation of the driving wheel are both added to the straddle-type vehicle, it is possible to realize the engine stop control at the time of overturning the vehicle body inexpensively, as compared with a case where one acceleration sensor is added.

Many straddle-type vehicles are already provided with a vehicle speed sensor which detects the rotation of the non-driving wheel or the driving wheel so as to detect a vehicle speed of the vehicle. Therefore, the determination of whether or not the non-driving wheel is in the substantially stopped state or the determination of whether or not the driving wheel is in the substantially rotating state can be performed by using the vehicle speed sensor which is already provided in the straddle-type vehicle. In this case, since it is only necessary to add one vehicle speed sensor to the straddle-type vehicle, it is possible to realize the engine stop control at the time of overturning the vehicle body inexpensively.

In addition, in a case where both of the vehicle speed sensor for detecting the rotation of the non-driving wheel and the vehicle speed sensor for detecting the rotation of the driving wheel are already provided in the straddle-type vehicle, both of the determination of whether or not the driving wheel is in the substantially stopped state and the determination of whether or not the driving wheel is in the substantially rotating state can be performed by using these two vehicle speed sensors which are already provided in the straddle-type vehicle. Therefore, it is possible to realize the engine stop control at the time of overturning the vehicle body even less expensively.

In addition, the engine control device according to the embodiment of the present invention includes a non-driving wheel state determination part, a driving wheel state determination part, and an engine stop control part. The non-driving wheel state determination part determines whether or not a non-driving wheel of a straddle-type vehicle is in a substantially stopped state. The driving wheel state determination part determines whether or not a driving wheel of the straddle-type vehicle is in a substantially rotating state. The engine stop control part performs engine stop control of the straddle-type vehicle when the non-driving wheel state determination part determines that the non-driving wheel is in a substantially stopped state and the driving wheel state determination part determines that the driving wheel is in the substantially rotating state. Similar to the engine control method of the embodiment of the present invention, due to the engine control device according to the embodiment of the present invention, it is possible to realize the engine stop control at the time of overturning the vehicle body inexpensively.

A first embodiment of the present invention will be described with reference to FIGS. 1 to 3. FIG. 1 shows a straddle-type vehicle 1. As shown in FIG. 1, the straddle-type vehicle 1 is, for example, a motorcycle. A head pipe 2A is provided in a front portion of a vehicle body frame 2 of the straddle-type vehicle 1, and a steering shaft is rotatably supported in the head pipe 2A in a counterclockwise direction or a clockwise direction. A front wheel 4 serving as a non-driving wheel is rotatably supported on the steering shaft via a front fork 3. In addition, a handlebar 5 is attached to the steering shaft, and an accelerator grip 6 is provided at a right end portion of the handlebar 5. In addition, a rear wheel 8 serving as a driving wheel is rotatably supported on a lower side of a rear portion of the vehicle body frame 2 via a swing arm 7.

An engine 9 is supported by the vehicle body frame 2 between the front wheels 4 and the rear wheels 8. The engine 9 includes a crankcase 10, a cylinder 11, and a cylinder head 12. A crankshaft is provided in a front portion of the crankcase 10, and a transmission device is provided in a rear portion of the crankcase 10. A clutch 13 is provided on a right side of a rear portion of the crankcase 10. Rotation of a drive shaft in the transmission device is transmitted to the rear wheel 8 via a drive chain. On the other hand, a piston is provided in the cylinder 11.

The cylinder head 12 is provided with an intake port and an exhaust port. An intake valve, an exhaust valve, and a valve mechanism are provided in the cylinder head 12, and an ignition plug is attached to the cylinder head 12. A throttle device 14 and a fuel injection device 15 are provided in the vicinity of the intake port.

Further, the straddle-type vehicle 1 is provided with a fuel tank 19, a driving seat 20, an exhaust pipe 21, a muffler 22, a shift pedal 23 or the like. In addition, the straddle-type vehicle 1 is provided with a stand 24 which supports the vehicle body when the straddle-type vehicle 1 is stopped.

Figure 2:
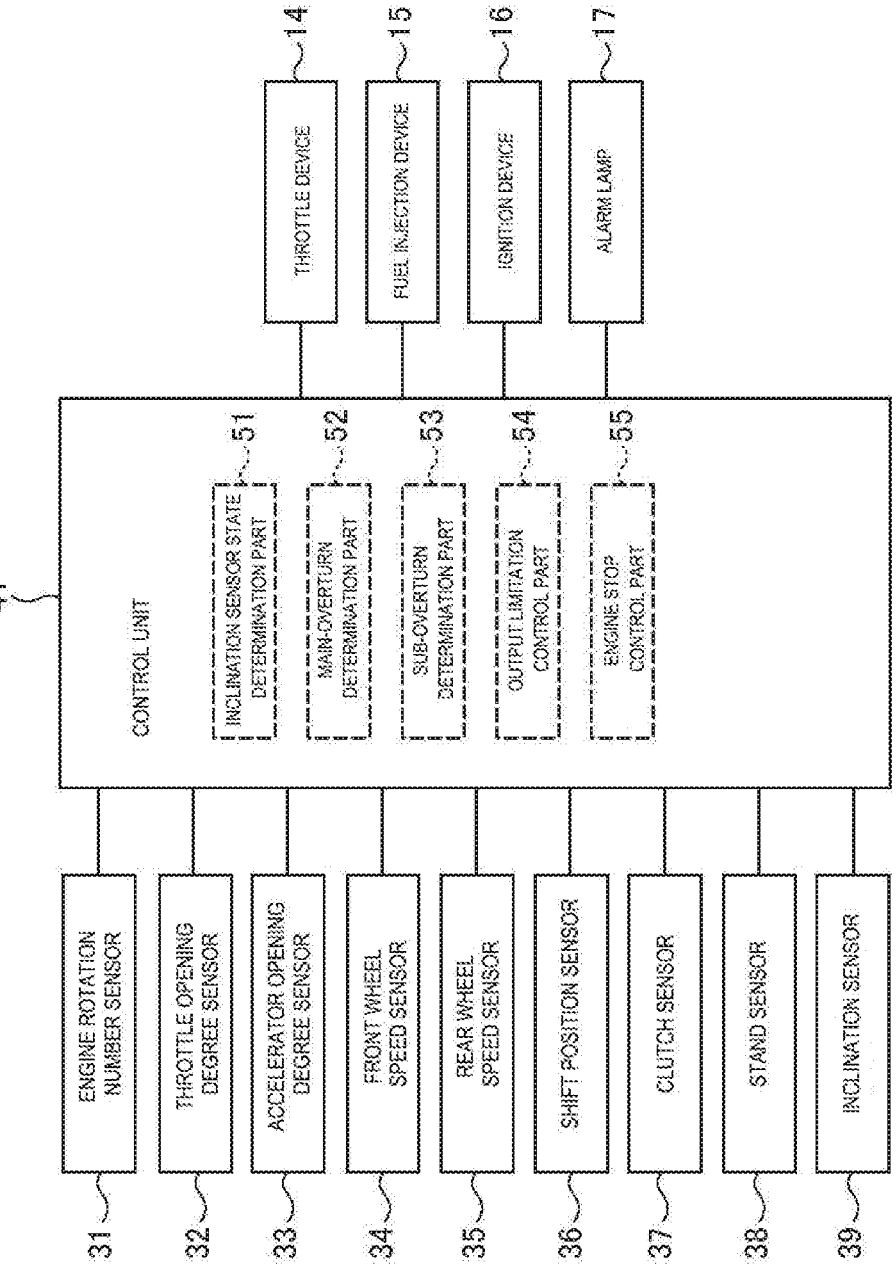
FIG. 2 is a block diagram illustrating sensors provided in the straddle-type vehicle, a control unit according to a first embodiment of the present invention, and controlled devices.

FIG. 2 illustrates the sensors provided in the straddle-type vehicle 1, a control unit 41 which is the engine control device according to the first embodiment of the present invention, and a controlled device. As shown in FIG. 2, the straddle-type vehicle 1 is provided with an engine rotation number sensor 31, a throttle opening degree sensor 32, and an accelerator opening degree sensor 33. The engine rotation number sensor 31 detects a rotation number of the engine 9 per unit time. The throttle opening degree sensor 32 detects a throttle opening degree which is an opening degree of a throttle valve in the throttle device 14. The accelerator opening degree sensor 33 detects an accelerator opening degree (accelerator operation amount) which is an opening degree of an accelerator. The accelerator opening degree sensor 33 is provided, for example, in the vicinity of the accelerator grip 6.

Further, the straddle-type vehicle 1 is provided with a front wheel speed sensor 34 and a rear wheel speed sensor 35. The front wheel speed sensor 34 is a vehicle speed sensor which detects a rotation number (rotation speed) of the front wheel 4 per unit time. The rear wheel speed sensor 35 is a vehicle speed sensor which detects a rotation number (rotation speed) of the rear wheel 8 per unit time.

Further, the straddle-type vehicle 1 is provided with a shift position sensor 36, a clutch sensor 37 and a stand sensor 38. The shift position sensor 36 detects a shift position (gear position) by detecting a rotation angle of a shift cam (or a shift drum) of the transmission device, for example. The clutch sensor 37 detects whether or not the clutch 13 is in a connected state. The stand sensor 38 detects whether or not the stand is in a stored state.

Further, the straddle-type vehicle 1 is provided with an inclination sensor 39. The inclination sensor 39 detects an inclination angle of the vehicle body of the straddle-type vehicle 1. The inclination sensor 39 is, for example, an acceleration sensor.

Further, the straddle-type vehicle 1 is provided with the control unit 41 which is the engine control device according to the first embodiment of the present invention. The control unit 41 includes, for example, an arithmetic processing device, a semiconductor memory device or the like. The above sensors 31 to 39 which are provided in the straddle-type vehicle 1 are connected to the control unit 41.

Further, a controlled device (a device controlled by the control unit 41) provided in the straddle-type vehicle 1 is connected to the control unit 41. Specifically, the throttle device 14, the fuel injection device 15, an ignition device 16 or the like are connected to the control unit 41. The throttle device 14 controls an amount of combustion air sucked into the intake port by changing the opening degree of the throttle valve. The fuel injection device 15 controls an amount of fuel injected into the air sucked into the intake port. The ignition device 16 controls ignition of the engine 9 in a combustion chamber by the ignition plug. Further, an alarm lamp 17 is connected to the control unit 41. The alarm lamp 17 is configured to notify a driver of the straddle-type vehicle 1 that the inclination sensor 39 is in an abnormal state, and is disposed in a cockpit in a front side of the handlebar 5, for example.

The control unit 41 performs the engine control processing. Specifically, the control unit 41 controls the throttle device 14, the fuel injection device 15, the alarm lamp 17 or the like based on detection signals which are respectively output from the front wheel speed sensor 34, the rear wheel speed sensor 35, the inclination sensor 39 or the like, so as to limit output of the engine 9, stop the engine 9 or the like.

In carrying out the engine control processing, the control unit 41 reads and executes a program stored in the semiconductor memory device, thereby functioning as an inclination sensor state determination part 51, a main-overturn determination part 52, a sub-overturn determination part 53, an output limitation control part 54, and an engine stop control part 55.

The inclination sensor state determination part 51 determines whether or not the inclination sensor 39 is in the abnormal state.

When the inclination sensor state determination part 51 determines that the inclination sensor 39 is not in the abnormal state, the main-overturn determination part 52 determines whether or not the straddle-type vehicle 1 is overturned based on a detection signal which is output from the inclination sensor 39.

When the inclination sensor state determination part 51 determines that the inclination sensor 39 is in the abnormal state, the sub-overturn determination part 53 determines whether or not the straddle-type vehicle 1 is overturned based on detection signals which are respectively output from the front wheel speed sensor 34 and the rear wheel speed sensor 35. The sub-overturn determination part 53 is a specific example of a non-driving wheel state determination part and a driving wheel state determination part.

When the inclination sensor state determination part 51 determines that the inclination sensor 39 is in the abnormal state, the output limitation control part 54 limits the output of the engine 9.

When the main-overturn determination part 52 or the sub-overturn determination part 53 determines that the straddle-type vehicle 1 is overturned, the engine stop control part 55 makes the engine 9 to stop.

Figure 3:
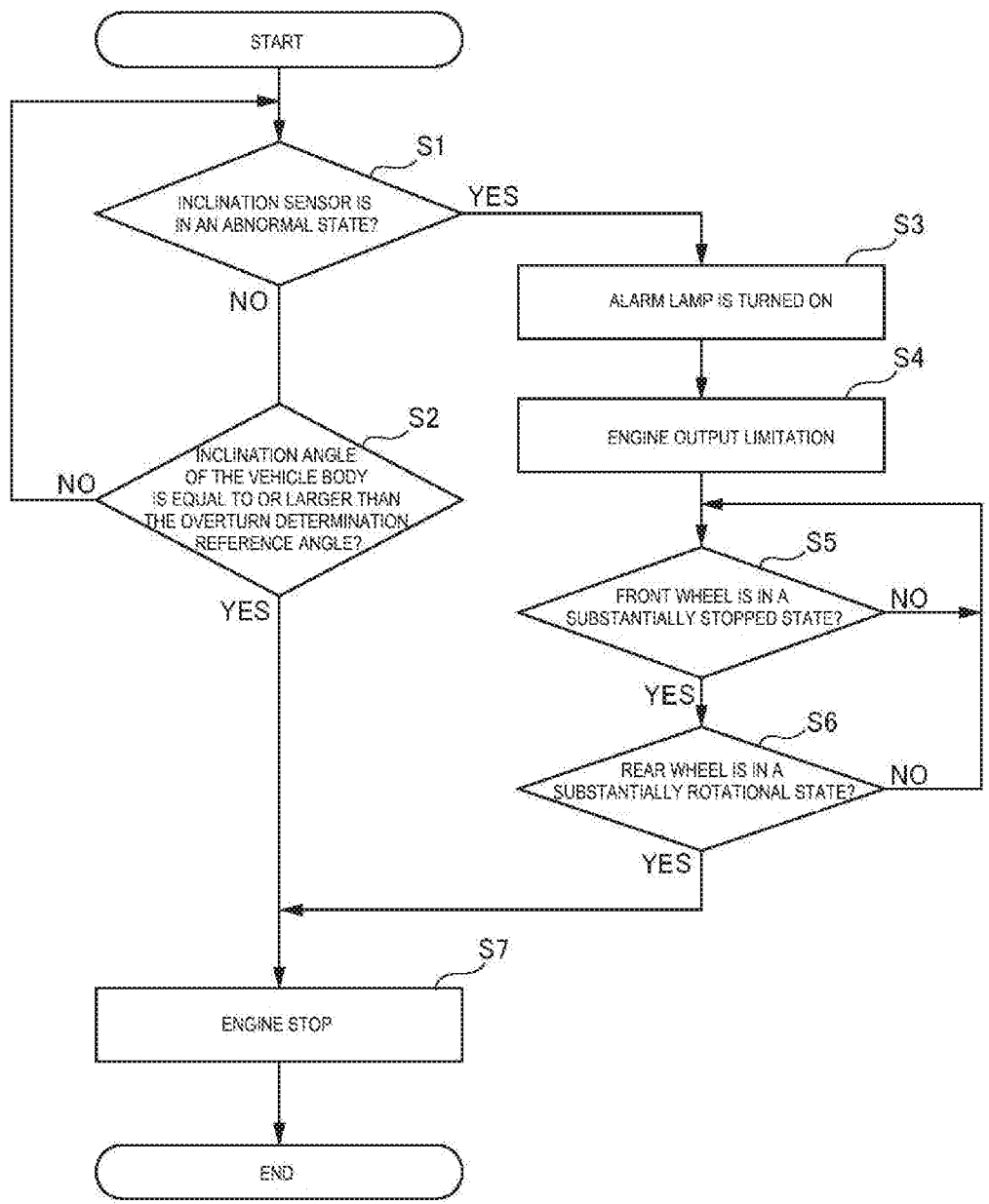
FIG. 3 is a flowchart illustrating an engine control processing according to the first embodiment of the present invention.

FIG. 3 illustrates the engine control processing performed by the control unit 41. The engine control processing illustrated in FIG. 3 is performed when the engine 9 is in operation. First, the inclination sensor state determination part 51 of the control unit 41 determines whether or not the inclination sensor 39 is in an abnormal state (step S1). The abnormal state of the inclination sensor 39 is, for example, a state in which the inclination sensor 39 is in a failure state, or a state in which electric power is not supplied from a battery to the inclination sensor 39 for some reasons although the straddle-type vehicle 1 is powered on. The inclination sensor state determination part 51 detects, for example, whether a detection signal which should be output from the inclination sensor 39 is not output, or a level of the detection signal which is output from the inclination sensor 39 is significantly lower (or significantly higher) than usual, or a waveform of the detection signal which is output from the inclination sensor 39 is not a normal waveform or the like, and determines that the inclination sensor 39 is in the abnormal state when such a detection result is obtained.

When the inclination sensor state determination part 51 determines that the inclination sensor 39 is not in the abnormal state (step S1: NO), subsequently, the main-overturn determination part 52 of the control unit 41 determines whether or not the straddle-type vehicle 1 is overturned based on the detection signal which is output from the inclination sensor 39. Specifically, the main-overturn determination part 52 determines whether or not the inclination angle of the vehicle body of the straddle-type vehicle 1 is equal to or larger than an overturn determination reference angle based on the detection signal output from the inclination sensor 39 (step S2). The overturn determination reference angle is, for example, larger than the maximum bank angle defined for the straddle-type vehicle 1. When the straddle-type vehicle 1 is overturned, the inclination angle of the vehicle body of the straddle-type vehicle 1 is equal to or larger than the overturn determination reference angle.

When the main-overturn determination part 52 determines that the inclination angle of the vehicle body of the straddle-type vehicle 1 is equal to or larger than the overturn determination reference angle (step S2: YES), the engine stop control part 55 of the control unit 41 performs stop control of the engine 9 (step S8). In the stop control of the engine 9, for example, the engine stop control part 55 controls the throttle device 14 to close the throttle valve, and controls the fuel injection device 15 to stop the fuel injection. As a result, the operation of the engine 9 is stopped.

On the other hand, when the inclination angle of the vehicle body of the straddle-type vehicle 1 is less than the overturn determination reference angle (step S2: NO), the stop control of the engine 9 is not performed, and the processing is returned to step S1.

Further, when the inclination sensor state determination part 51 determines that the inclination sensor 39 is in the abnormal state in step S1 (step S1: YES), the inclination sensor state determination part 51 turns on the alarm lamp 17

(step S3). Thus, the driver of the straddle-type vehicle 1 can know that the inclination sensor 39 is in the abnormal state.

Subsequently, the output limitation control part 54 of the control unit 41 performs the output limitation control of the engine 9 (step S4). The output limitation control of the engine 9 will be described later.

Subsequently, the sub-overturn determination part 53 of the control unit 41 determines whether or not the straddle-type vehicle 1 is overturned based on the detection signals which are respectively output from the front wheel speed sensor 34 and the rear wheel speed sensor 35 (steps S5 and S6).

Specifically, in step S5, the sub-overturn determination part 53 determines whether or not the front wheel 4 is in a substantially stopped state based on the detection signal output from the front wheel speed sensor 34. The substantially stopped state is a state in which a wheel is completely stopped or a state in which the wheel is not completely stopped but rotation speed thereof is very slow and can be regarded as being stopped. Specifically, when the rotational speed of the front wheel 4 is less than a predetermined determination reference rotation speed, the sub-overturn determination part 53 determines that the front wheel 4 is in the substantially stopped state.

When the front wheel 4 is in the substantially stopped state, the sub-overturn determination part 53 determines whether or not the rear wheel 8 is in a substantially rotating state in step S6. The substantially rotating state is a state in which the wheel is not in the above substantially stopped state, that is, the wheel is not stopped and cannot be regarded as being stopped. Specifically, when the rotation speed of the rear wheel 8 is equal to or greater than the determination reference rotation speed, the sub-overturn determination part 53 determines that the rear wheel 8 is in the substantially rotating state.

When the front wheel 4 is in the substantially stopped state and the rear wheel 8 is in the substantially rotating state (both of steps S5 and S6 are YES), the engine stop control part 55 performs the stop control of the engine 9 (step S7). That is, when the straddle-type vehicle 1 is overturned, the front wheel 4 is no longer in a state of rotating on the ground but stops, and the driving wheel keeps rotating by receiving power transmitted from the engine 9 until the engine 9 stops. Therefore, when the front wheel 4 is in the substantially stopped state and the rear wheel 8 is in the substantially rotating state, it can be determined that the straddle-type vehicle 1 is overturned. In this case, the engine 9 is stopped.

On the other hand, when the front wheel 4 is not in the substantially stopped state or the rear wheel 8 is not in the substantially rotating state (step S5 or S6 is NO), the stop control of the engine 9 is not performed, and the processing is returned to step S5.

The control unit 41 executes the engine control processing illustrated in FIG. 3 again from step S1 when the engine 9 is operated again by a driver's operation after being stopped by the engine stop control in step S7 or by a driver's operation.

As described above, when the inclination sensor 39 is in the abnormal state, the output limitation control part 54 of the control unit 41 performs the output limitation control of the engine 9 in step S4 in FIG. 3. In the output limitation control of the engine 9, the output limitation control part control part 54 reduces the output of the engine 9 by making, for example, a fuel injection amount smaller than that of a normal time (when the inclination sensor 39 is not in the abnormal state). For example, an upper limit of the fuel injection amount is made smaller than that of the normal time. Alternatively, in the output limitation control of the engine 9, the throttle opening degree with respect to a throttle operation amount is made smaller than that of the normal time, whereby an amount of air sucked into the combustion chamber is reduced in accordance with the throttle operation amount, and the output of the engine 9 may be reduced. For example, the upper limit of the throttle opening degree may be set to about 50% of the normal time. In this output limitation control, the output of the engine 9 is reduced, so that the driver of the straddle-type vehicle 1 cannot drive in a manner in which the front wheels 4 is stopped and the rear wheel 8 is rotated, such as a wheelie or wheel spin. On the other hand, even when the inclination sensor 39 is in the abnormal state, the driver can make the straddle-type vehicle 1 run at medium and low speed (for example, about 60 km at a maximum).

As described above, in the engine control processing performed by the control unit 41 according to the first embodiment of the present invention, when the inclination sensor 39 is in the abnormal state, the front wheel speed sensor 34 and the rear wheel speed sensor 35 are used to perform the engine stop control at the time of overturning the vehicle body of the straddle-type vehicle 1. The vehicle speed sensors which are respectively used as the front wheel speed sensor 34 and the rear wheel speed sensor 35 are less expensive than the acceleration sensor as the inclination sensor 39. Therefore, by adding an inexpensive vehicle speed sensor to the straddle-type vehicle 1, it is possible to realize the engine stop control at the time of overturning the vehicle body under the abnormal state of the inclination sensor 39 inexpensively. In the case where the vehicle speed sensor used as the front wheel speed sensor 34 or the vehicle speed sensor used as the rear wheel speed sensor 35 is already provided in the straddle-type vehicle 1, it is possible to realize the engine stop control at the time of overturning the vehicle body under the abnormal state of the inclination sensor 39 inexpensively by using the vehicle speed sensor which is already provided.

In the engine control processing performed by the control unit 41, the output limitation control of the engine 9 is performed when the inclination sensor 39 is in the abnormal state. In this output limitation control, the output of the engine 9 is reduced than that of the normal time, and the driver of the straddle-type vehicle 1 cannot drive in a manner of wheelie or wheel spin. In this way, it is possible to reliably perform the engine stop control at the time of overturning the vehicle body under the abnormal state of the inclination sensor 39. That is, in a running manner such as wheelie or wheel spin, the rear wheels 8 may rotate in a state where the front wheel 4 is stopped. Therefore, in a case where the driver drives in a manner such as wheelie or wheel spin when the inclination sensor 39 is in the abnormal state, there is a concern that the control unit 41 may erroneously determine that the vehicle body is overturned, and execute the engine stop control. Such an erroneous determination can be prevented by disabling the running manner of wheelie or wheel spin when the inclination sensor 39 is in the abnormal state.

In the engine control processing performed by the control unit 41, when the inclination sensor 39 is in the abnormal state, the output limitation control of the engine 9 is performed, and the engine stop control at the time of overturning the vehicle body in which the front wheel speed sensor 34 and the rear wheel speed sensor 35 are used is performed. Thus, even when the inclination sensor 39 is in the abnormal state, it is possible to ensure that the engine automatically stops at the time of overturning the vehicle body. Therefore, even after the inclination sensor 39 becomes abnormal, the safety of driving the straddle-type vehicle 1 can be ensured, so that the driver is allowed to drive the straddle-type vehicle 1 after the inclination sensor 39 becomes abnormal. Accordingly, the driver can continue driving the straddle-type vehicle 1 even after the inclination sensor 39 becomes abnormal. In this way, convenience in using the straddle-type vehicle 1 can be ensured.

In addition, according to the engine control processing performed by the control unit 41, it is possible to notify the driver that the inclination sensor 39 is in the abnormal state by turning on the alarm lamp 17. Alternatively, the running of the straddle-type vehicle 1 is slowed by the output limitation control of the engine 9, through which the driver can recognize the abnormal state of the inclination sensor 39.

Further, when the inclination sensor 39 is not in the abnormal state, the inclination sensor 39 is used to perform the engine stop control at the time of overturning the vehicle body, so that it is possible to allow a professional driver who performs a race or a show to drive in the manner of wheelie or wheel spin as long as the inclination sensor 39 is not in the abnormal state.

Figure 4:
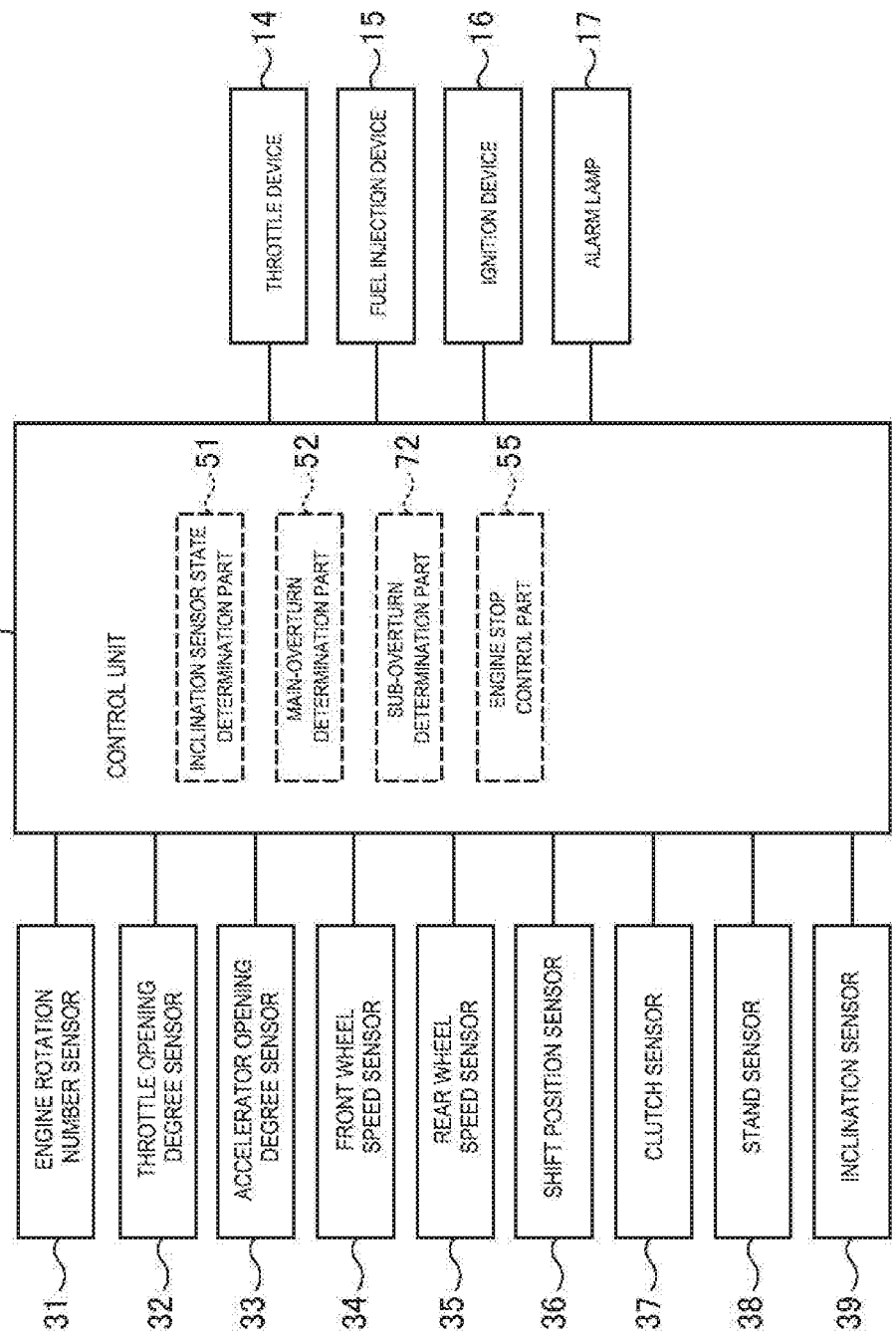
FIG. 4 is a block diagram illustrating sensors provided in the straddle-type vehicle, a control unit according to a second embodiment of the present invention, and controlled devices.

A second embodiment of the present invention will be described with reference to FIGS. 4 and 5. FIG. 4 illustrates sensors provided in a straddle-type vehicle 1, a control unit 71 which is the engine control device according to the second embodiment of the present invention, and controlled devices. In FIG. 4, the same components as those in the first embodiment of the present invention are denoted by the same reference numerals, and description thereof is omitted.

Similar to the control unit 41 according to the first embodiment, the control unit 71 is provided in the straddle-type vehicle 1, and includes an arithmetic processing device and a semiconductor memory device for example. In addition, sensors 31 to 39 and controlled devices 14 to 17 provided in the straddle-type vehicle 1 are connected to the control unit 71. The control unit 71 reads and executes a program stored in the semiconductor memory device, thereby functioning as the inclination sensor state determination part 51, the main-overturn determination part 52, a sub-overturn determination part 72, and the engine stop control part 55.

When the inclination sensor state determination part 51 determines that the inclination sensor 39 is in an abnormal state, the sub-overturn determination part 72 determines whether or not the straddle-type vehicle 1 is overturned based on the detection signals respectively output from the front wheel speed sensor 34, the rear wheel speed sensor 35, and the accelerator opening degree sensor 33. In addition, the sub-overturn determination part 72 is a specific example of a non-driving wheel state determination part and a driving wheel state determination part.

Figure 5:
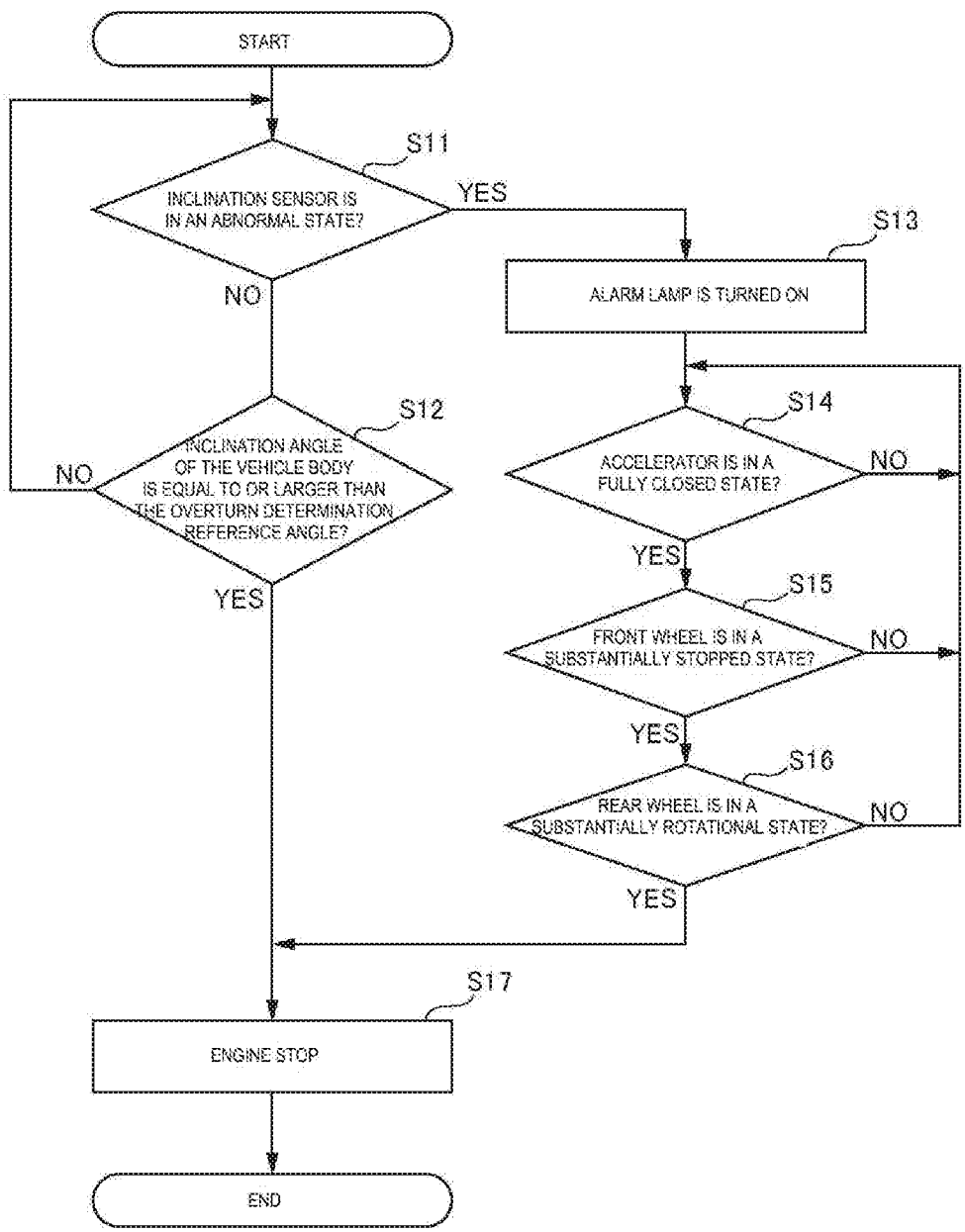
FIG. 5 is a flowchart illustrating an engine control processing according to the second embodiment of the present invention.

FIG. 5 illustrates the engine control processing performed by the control unit 71. In the engine control processing in FIG. 5, first, the inclination sensor state determination part 51 determines whether or not the inclination sensor 39 is in the abnormal state, and then when the inclination sensor 39 is not in the abnormal state, based on the detection signal output from the inclination sensor 39, the main-overturn determination part 52 determines whether or not the inclination angle of the vehicle body of the straddle-type vehicle 1 is equal to or larger than the overturn determination reference angle. When the inclination angle of the vehicle body of the straddle-type vehicle 1 is equal to or larger than the overturn determination reference angle, the engine stop control part 55 performs stop control of the engine 9 (steps S11, S12 and S17). These processing are the same as steps S1, S2, and S7 in the engine control processing performed by the control unit 41 according to the first embodiment.

On the other hand, when the inclination sensor 39 is in the abnormal state (step S11: YES), the inclination sensor state determination part 51 turns on the alarm lamp 17 (step S13). Subsequently, based on the detection signal output from the accelerator opening degree sensor 33, the sub-overturn determination part 72 determines whether or not the accelerator is in a fully closed state (step S14). The fully closed state of the accelerator is a state in which an accelerator operation amount is zero, and an accelerator opening degree is zero.

When the accelerator is in the fully closed state, the sub-overturn determination part 72, as the sub-overturn determination part 53 according to the first embodiment, determines whether or not the front wheel 4 is in the substantially stopped state based on the detection signal output from the front wheel speed sensor 34 (step S15). Then, when the front wheel 4 is in the substantially stopped state, the sub-overturn determination part 72, as the sub-overturn determination part 53 according to the first embodiment, determines whether or not the rear wheel 8 is in the substantially rotating state (step S16).

When the accelerator is in the fully closed state, the front wheel 4 is in the substantially stopped state and the rear wheel 8 is in the substantially rotating state (all of steps S14, S15 and S16 are YES), the engine stop control part 55 performs stop control of the engine 9 (step S17). That is, when the straddle-type vehicle 1 is overturned, the driver's hands moves away from the accelerator grip 6, so that the accelerator is in the fully closed state, the front wheel 4 is no longer in a state of rotating on the ground but stops, and the driving wheel keeps rotating by receiving power transmitted from the engine 9 until the engine 9 stops. Therefore, when the accelerator is in the fully closed state, the front wheel 4 is in the substantially stopped state, and the rear wheel 8 is in the substantially rotating state, it can be determined that the straddle-type vehicle 1 is overturned. In this case, the engine 9 is stopped.

On the other hand, when the accelerator is not in the fully closed state, and the front wheel 4 is not in the substantially stopped state or the rear wheel 8 is not in the substantially rotating state (steps S14, S15 or S16 is NO), the stop control of the engine 9 is not performed, and the processing is returned to step S14.

The engine control processing is executed again from step S11 when the engine 9 is operated again by a driver's operation after being stopped by the engine stop control in step S7 or by a driver's operation.

In the engine control processing performed by the control unit 71 according to the second embodiment of the present invention, when the inclination sensor 39 is in the abnormal state, the front wheel speed sensor 34 and the rear wheel speed sensor 35 are used to perform the engine stop control at the time of overturning the vehicle body of the straddle-type vehicle 1. Therefore, similar to the engine control processing performed by the control unit 41 according to the first embodiment of the present invention, it is possible to realize the engine stop control at the time of overturning the vehicle body under the abnormal state of the inclination sensor 39 inexpensively.

In addition, in the engine control processing performed by the control unit 71, when the inclination sensor 39 is in an abnormal state, in addition to the front wheel speed sensor 34 and the rear wheel speed sensor 35, the accelerator opening degree sensor 33 is used to perform the engine stop control at the time of overturning the vehicle body of the straddle-type vehicle 1. Therefore, it is possible to improve the accuracy of the engine stop control (determination on whether the vehicle body is overturned) at the time of overturning the vehicle body. When the accelerator opening degree sensor 33 is already provided in the straddle-type vehicle 1, it is possible to realize engine stop control at the time of overturning the vehicle body under the abnormal state of the inclination sensor 39 inexpensively by using the accelerator opening degree sensor 33 which is already provided.

In the engine control processing performed by the control unit 71, whether or not the accelerator is in the fully closed state is determined when determining whether or not the straddle-type vehicle 1 is overturned. Therefore, even when the driver of the straddle-type vehicle 1 drives in a manner in which the front wheels 4 is stopped and the rear wheel 8 rotated, such as wheelie or wheel spin, such a manner can be prevented from being erroneously determined as overturn of the straddle-type vehicle 1. That is, when the wheelie or the wheel spin is performed, the accelerator is opened so as to rotate the rear wheel 8. Thus, the wheelie or wheel spin and the overturn can be identified based on whether or not the accelerator is in fully closed state. Therefore, in the engine control processing performed by the control unit 71, the output limitation control (step S4 in FIG. 3) of the engine 9 in the engine control processing performed by the control unit 41 of the first embodiment may not be performed.

In the engine control processing according to the above first embodiment, there is described an example in which when the inclination sensor 39 is in the abnormal state, the engine stop control is performed immediately when two conditions, which are the front wheel 4 being in the substantially stopped state and the rear wheel 8 being in the substantially rotating state, are satisfied. However, the engine stop control may be performed when a state in which the two conditions are satisfied continues for a predetermined time (for example, about 5 seconds) when the inclination sensor 39 is in the abnormal state. As a result, the reliability of the vehicle body overturn determination using the front wheel speed sensor 34 and the rear wheel speed sensor 35 can be enhanced. Similarly, in the engine control processing according to the above second embodiment, the engine stop control may be performed when a state in which three conditions, which are the accelerator being in the fully closed state, the front wheel 4 being in the substantially stopped state, and the rear wheel 8 being in the substantially rotating state, are satisfied continues for a predetermined time. As a result, the reliability of vehicle body overturn determination using the accelerator opening degree sensor 33, the front wheel speed sensor 34, and the rear wheel speed sensor 35 can be enhanced.

In each of the above embodiments, an alarm mark may be displayed on a display provided in the cockpit instead of the alarm lamp 17 as a means for notifying the abnormal state of the inclination sensor 39. In addition to such a visual alert, an alarm sound may be emitted from a speaker provided in the vicinity of the cockpit.

Further, in each of the above embodiments, the inclination sensor 39 is not limited to the acceleration sensor, and may also be an inertial sensor with higher accuracy than the acceleration sensor, for example.

In the above first embodiment, there is described an example in which the engine stop control at the time of overturning the vehicle body using the front wheel speed sensor 34 and the rear wheel speed sensor 35 is performed preliminarily when the inclination sensor 39 is in the abnormal state, while the present invention is not limited thereto. For example, in a straddle-type vehicle in which power of an engine is low at the first place, and both wheelie and wheel spin cannot be performed in terms of performance, it may be configured that the engine stop control at the time of overturning the vehicle body using the front wheel speed sensor 34 and the rear wheel speed sensor 35 is performed as a main or the only engine stop control at the time of overturning the vehicle body.

In the above second embodiment, there is described an example in which the engine stop control at the time of overturning the vehicle body using the accelerator opening degree sensor 33, the front wheel speed sensor 34, and the rear wheel speed sensor 35 is performed preliminarily when the inclination sensor 39 is in the abnormal state, but it may also be configured that the engine stop control at the time of overturning the vehicle body using the accelerator opening degree sensor 33, the front wheel speed sensor 34, and the rear wheel speed sensor 35 is performed as a main or the only engine stop control at the time of overturning the vehicle body.

In the engine control processing according to the above second embodiment, the accelerator opening degree sensor 33 is used to determine the fully closed state of the accelerator, but the throttle opening degree sensor 32 may also be used instead of the accelerator opening degree sensor 33. For example, based on a detection signal output from the throttle opening degree sensor 32, when the throttle valve is in a substantially closed state (a state in which the throttle valve is fully closed or a state in which the throttle valve is slightly opened but it can be regarded as closed), it is determined that the accelerator opening degree is in the fully closed state. Instead of the accelerator opening degree sensor 33, a contact sensing sensor may also be used to detect whether or not the driver's hand is in contact with the accelerator grip 6. In this case, when the driver's hand is not in contact with the accelerator grip 6, it is determined that the accelerator opening degree is in the fully closed state.

In the engine control processing according to the above second embodiment, when the inclination sensor 39 is in the abnormal state, the output limitation control of the engine 9 may be performed similar to the engine control processing according to the first embodiment.

In the engine control processing according to each of the above embodiments, any one or some or all of the following conditions may be added as a condition for determining the overturn of the vehicle body when the inclination sensor 39 is in the abnormal state. The conditions are: the engine rotation number being within a predetermined rotation number, a shift position being other than neutral, the clutch being connected, and the stand 24 being stored. In this case, the shift position sensor 36, the clutch sensor 37, the stand sensor 38 or the like provided in the straddle-type vehicle 1 are used so as to determine whether these conditions are satisfied.

Further, the present invention is applicable not only to motorcycles but also to other types of straddle-type vehicles such as a three-wheeled motorcycle, a buggy or the like. The present invention is also applicable to a straddle-type vehicle in which the front wheel is the driving wheel and the rear wheel is the non-driving wheel.

In the engine control processing according to the above first embodiment, in FIG. 3, step S1 is a specific example of the inclination sensor state determination step, step S4 is a specific example of an output limitation step, step S5 is a specific example of the non-driving wheel state determination step, step S6 is a specific example of the driving wheel state determination step, and step S7 is a specific example of the engine stop control step. In the engine control processing according to the above second embodiment, in FIG. 5, step S11 is a specific example of the inclination sensor state determination step, step S14 is a specific example of the accelerator state determination step, step S15 is a specific example of the non-driving wheel state determination step, step S16 is a specific example of the driving wheel state determination step, and step S17 is a specific example of the engine stop control step.

According to the present invention, it is possible to realize the engine stop control at the time of overturning the vehicle body inexpensively.

Further, the present invention can be appropriately changed within a scope not contrary to the gist or idea of the present invention which can be read from the entire claims and the specification, and an engine control method and an engine control device with such a change are also included in the technical concept of the present invention.

What is claimed is:

1. An engine control method for a straddle-type vehicle, the engine control method comprising:
   a non-driving wheel state determination step of determining whether a non-driving wheel of a straddle-type vehicle is in a substantially stopped state;
   a driving wheel state determination step of determining whether a driving wheel of the straddle-type vehicle is in a substantially rotating state; and
   an engine stop control step of performing an engine stop control of the straddle-type vehicle; and
   an inclination sensor state determination step of determining whether an inclination sensor for detecting an inclination angle of the straddle-type vehicle is in an abnormal state,
   wherein, in the engine stop control step, the engine stop control of the straddle-type vehicle is performed when both of a non-driving wheel condition and a driving wheel condition are satisfied,
   wherein the non-driving wheel condition is that it is determined that the non-driving wheel is in the substantially stopped state in the non-driving wheel state determination step,
   wherein the driving wheel condition is that it is determined that the driving wheel is in the substantially rotating state in the driving wheel state determination step,
   wherein, in the engine stop control step, the engine stop control of the straddle-type vehicle is performed when an inclination sensor condition is satisfied in addition to the non-driving wheel condition and the driving wheel condition, and
   wherein the inclination sensor condition is that it is determined that the inclination sensor is in the abnormal state in the inclination sensor state determination step.

2. The engine control method according to claim 1, further comprising:
   an output limitation step of limiting an output of an engine when the inclination sensor condition is satisfied.

3. The engine control method according to claim 1,
   wherein, in the engine stop control step, the engine stop control of the straddle-type vehicle is performed when an overturn condition is satisfied in addition to the non-driving wheel condition and the driving wheel condition, even when it is determined that the inclination sensor is not in the abnormal state in the inclination sensor state determination step, and
   wherein the overturn condition is that the inclination angle of the straddle-type vehicle is equal to or larger than a predetermined overturn determination reference angle based on a detection result of the inclination sensor.

4. An engine control method for a straddle-type vehicle, the engine control method comprising:
   a non-driving wheel state determination step of determining whether a non-driving wheel of a straddle-type vehicle is in a substantially stopped state;
   a driving wheel state determination step of determining whether a driving wheel of the straddle-type vehicle is in a substantially rotating state;
   an engine stop control step of performing an engine stop control of the straddle-type vehicle; and
   an accelerator state determination step of determining whether an accelerator of the straddle-type vehicle is in a fully closed state,
   wherein, in the engine stop control step, the engine stop control of the straddle-type vehicle is performed when both of a non-driving wheel condition and a driving wheel condition are satisfied,
   wherein the non-driving wheel condition is that it is determined that the non-driving wheel is in the substantially stopped state in the non-driving wheel state determination step,
   wherein the driving wheel condition is that it is determined that the driving wheel is in the substantially rotating state in the driving wheel state determination step,
   wherein, in the engine stop control step, the engine stop control of the straddle-type vehicle is performed when an accelerator condition is satisfied in addition to the non-driving wheel condition and the driving wheel condition, and
   wherein the accelerator condition is that it is determined that the accelerator is in the fully closed state in the accelerator state determination step.

5. The engine control method according to claim 4, further comprising:
   an inclination sensor state determination step of determining whether an inclination sensor for detecting an inclination angle of the straddle-type vehicle is in an abnormal state,
   wherein, in the engine stop control step, the engine stop control of the straddle-type vehicle is performed when an inclination sensor condition is satisfied in addition to the non-driving wheel condition, the driving wheel condition and the accelerator condition, and
   wherein the inclination sensor condition is that it is determined that the inclination sensor is in the abnormal state in the inclination sensor state determination step.

6. The engine control method according to claim 5,
   wherein, in the engine stop control step, the engine stop control of the straddle-type vehicle is performed when an overturn condition is satisfied in addition to the non-driving wheel condition, the driving wheel condition, the accelerator condition and the inclination sensor condition, and
   wherein the overturn condition is that it is determined that the inclination angle of the straddle-type vehicle is equal to or larger than a predetermined overturn determination reference angle based on a detection result of the inclination sensor.

7. An engine control device for a straddle-type vehicle, the engine control device comprising:

a non-driving wheel state determination part which determines whether a non-driving wheel of the straddle-type vehicle is in a substantially stopped state;

a driving wheel state determination part which determines whether a driving wheel of the straddle-type vehicle is in a substantially rotating state;

an engine stop control part which performs engine stop control of the straddle-type vehicle; and an inclination sensor state determination step of determining whether an inclination sensor for detecting an inclination angle of the straddle-type vehicle is in an abnormal state, wherein the engine stop control part performs the engine stop control of the straddle-type vehicle when the non-driving wheel state determination part determines that the non-driving wheel is in the substantially stopped state, and the driving wheel state determination part determines that the driving wheel is in the substantially rotating state, wherein, in the engine stop control step, the engine stop control of the straddle-type vehicle is performed when an inclination sensor condition is satisfied in addition to the non-driving wheel condition and the driving wheel condition, and wherein the inclination sensor condition is that it is determined that the inclination sensor is in the abnormal state in the inclination sensor state determination step.

* * * * *